US009703835B2

(12) United States Patent
Han et al.

(10) Patent No.: US 9,703,835 B2
(45) Date of Patent: Jul. 11, 2017

(54) DYNAMIC STREAM COMPUTING TOPOLOGY

(71) Applicant: Pivotal Software, Inc., San Francisco, CA (US)

(72) Inventors: Leng Han, Beijing (CN); Yanhui Zhao, Beijing (CN); Xiong Li, Beijing (CN); Xiaoming Gao, Beijing (CN); Ye Li, Beijing (CN)

(73) Assignee: Pivotal Software, Inc., San Francisco, CA (US)

( * ) Notice: Subject to any disclaimer, the term of this patent is extended or adjusted under 35 U.S.C. 154(b) by 370 days.

(21) Appl. No.: 14/539,010

(22) Filed: Nov. 12, 2014

(65) Prior Publication Data

US 2016/0132560 A1 May 12, 2016

Related U.S. Application Data

(63) Continuation of application No. PCT/CN2013/086980, filed on Nov. 12, 2013.

(51) Int. Cl.
*G06F 17/30* (2006.01)

(52) U.S. Cl.
CPC .. *G06F 17/30516* (2013.01); *G06F 17/30958* (2013.01)

(58) Field of Classification Search
CPC ............. G06F 17/30516; G06F 17/30958
See application file for complete search history.

(56) References Cited

U.S. PATENT DOCUMENTS

| 8,359,305 B1 * | 1/2013 | Burke ............... G06F 17/30988 707/706 |
| 2003/0101253 A1 | 5/2003 | Saito et al. |
| 2003/0126235 A1 | 7/2003 | Chandrasekar et al. |
| 2010/0205172 A1 * | 8/2010 | Luk .................. G06F 17/30616 707/715 |

OTHER PUBLICATIONS

International Search Report and Written Opinion in International Application No. PCT/CN2013/086980, mailed Aug. 4, 2014, 9 pages.
Ballard et al., "IBM InfoSphere Streams: Assembling Continuous Insight in the Information Revolution," Oct. 10, 2011, 456 pages.

* cited by examiner

*Primary Examiner* — Kris Mackes
(74) *Attorney, Agent, or Firm* — Fish & Richardson P.C.

(57) ABSTRACT

Methods, systems, and apparatus, including computer programs encoded on computer storage media, for dynamic topology generation. One of the methods includes receiving, from a user, a query that specifies a search criterion and a post-processing function prototype. A topology definition is generated from the query that specifies one or more source nodes and at least one processing node, wherein the processing node is specified in the topology to output a stream of data objects corresponding to the data object identifiers and a post-processing node according to the post-processing function prototype, wherein the post-processing node is specified in the topology to receive a stream of data objects output by the processing node, and is specified in the topology to output one or more modified data objects. The topology definition is then provided to a real-time stream computing system for execution.

23 Claims, 4 Drawing Sheets

DYNAMIC STREAM COMPUTING TOPOLOGY

BACKGROUND

This specification relates to stream computing.

Stream computing refers to systems and techniques for continually processing unbounded sequences of objects in real time, e.g., receiving incoming streams of data objects, processing the data objects, and producing output streams of modified data objects. For example, the objects may represent page requests received by a web site or microblog messages posted by users. Stream computing systems can provide immediate search results as data objects are found, as well as continually process new data objects as they are received.

Distributed stream computing systems can include multiple computing nodes that process data to generate sequences of data objects, the sequence referred to as a stream. An example streaming data object is a list of named values referred to as a tuple. The computing nodes can perform various operations on the streams in a particular order.

The operations performed by nodes in a stream computing system can be defined by a topology. A topology is a computing graph of compute nodes and the respective stream transformations performed by the computing nodes. Computing nodes that read raw data and generate streams in the first instance may be referred to as source nodes, or "spouts;" and computing nodes that subscribe to streams, perform operations on the data, and pass on transformed streams may be referred to as processing nodes, or "bolts." Edges in the topology indicate which bolts subscribe to which streams. Nodes in a stream computing topology are typically configured to process streams indefinitely.

Figure 1A:
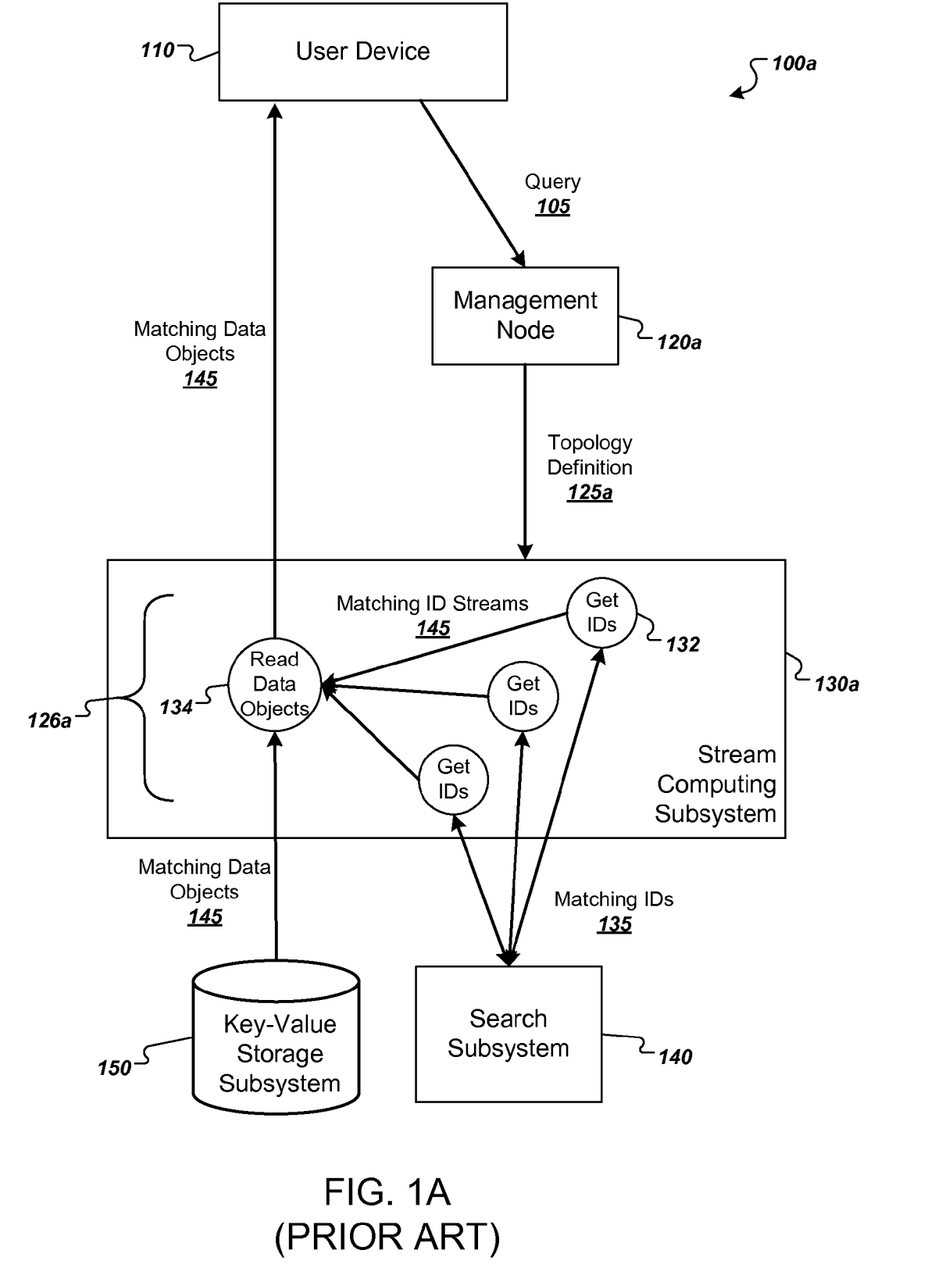
FIG. 1A is a diagram of an example prior art system.

FIG. 1A is a diagram of an example prior art system. The system includes a stream computing subsystem 130a that processes streams of data objects from a key-value storage subsystem 150, e.g., a Hadoop Database (HBase) that stores data by key-value pairs in distinct column families. The storage subsystem 150 can alternatively be a relational database or any other appropriate storage subsystem.

The stream computing subsystem 130a generates streams using source nodes and processing nodes of a topology 126a according to a topology definition 125a received from a management node 120a. An example stream computing subsystem is the Storm distributed real-time computation system. (Storm is described at http://storm-project.net/ and documentation identified there.)

A user of user device 110 can query the key-value storage subsystem to obtain matching data objects 145. The user device 110 can be a personal computer, smartphone, or any other kind of computer-based device with which a user can interact. The user 110 device issues a query 105 to the management node 120a. The management node 120a parses the query 105 and generates one or more processes required to identify matching data objects 145 that satisfy the query 105. The management node 120a generates a corresponding topology definition 125a of the processes required to satisfy the query 105; the topology definition 125a maps the processes to source nodes and processing nodes. For example, satisfying the query 105 generally requires filter processes that filter streams of data objects from the key-value storage subsystem 150 and read processes to read data objects from the key-value storage subsystem 150. The topology definition 125a is then used to generate a topology that is run on a cluster of computers.

A search subsystem 140 can index data objects in the key-value storage subsystem 150 for more efficient retrieval of matching data objects. An example search subsystem 104 is the Apache Solr™ search platform. ("Apache Solr" is a trademark of The Apache Software Foundation.) One or more source nodes, e.g., source node "Get IDs" 132, in the topology 126a will communicate with the search subsystem 140 to obtain matching identifiers 135 of data objects that satisfy the query 105. The source nodes will then generate matching identifier streams 145 that are received by a processing node "Read Data Objects" 134 in the topology 126a. The processing node 134 receives the matching identifier streams from the source nodes and requests the data objects from the key-value storage subsystem 150. The processing node 134 can use batch processing techniques to improve the performance of reading the data objects from the key-value storage subsystem 150. For example, the processing node 134 can wait to request data objects from the key-value storage subsystem 150 until at least a minimum number of identifier tuples have been received from the matching identifier streams 145. The processing node 134 can then return the matching data objects 145 to the user device 110.

The topology definition 125a that defines the structure of the topology 126a is typically generated automatically according to logic in the management node 120a. Alternatively, the topology definition 125a can be programmed by a developer in advance. A user typically has no runtime control over the structure of the topology 126a in the stream computing subsystem 130a.

SUMMARY

This specification describes how a system can generate dynamic stream computing topologies according to user input. In general, a user can specify at runtime a query and one or more post-processing function prototypes. The system can then generate a topology that includes post-processing nodes that perform the actions of the user-specified function prototypes.

In general, one innovative aspect of the subject matter described in this specification can be embodied in methods that include the actions of receiving, from a user, a query that specifies a search criterion and a post-processing function prototype; generating, from the query, a topology definition that specifies: one or more source nodes and at least one processing node, wherein the processing node is specified in the topology to receive, from the one or more source nodes, one or more streams of data object identifiers of data objects that satisfy the search criterion, and wherein the processing node is specified in the topology to output a stream of data objects corresponding to the data object identifiers; and a post-processing node according to the post-processing function prototype, wherein the post-processing node is specified in the topology to receive a stream of data objects output by the processing node, perform one or more operations on the data objects according to the post-processing function prototype, and is specified in the topology to output one or more modified data objects; and providing the topology definition to a real-time stream computing system for execution. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The data object identifiers of data objects that satisfy the search query are data objects having field values that satisfy the search terms. The actions include receiving, from the user, an argument for the post-processing function prototype, wherein the post-processing node is specified in the topology to perform the one or more operations on the data objects using the argument. The post-processing node generated from the post-processing function prototype is specified in the topology to extract fields from the received data objects according to the argument and provides the extracted fields as output. The post-processing node generated from the post-processing function prototype is specified in the topology to filter the data objects received by the post-processing node according to the argument and provides the filtered data objects as output. The post-processing node generated from the function prototype is specified in the topology to aggregate one or more data object values specified by the argument and provides an aggregated value as output. The query and the identifier of the post-processing function are text provided as input by the user. The actions include receiving a second identifier of a different, second post-processing function prototype, wherein the topology definition specifies a second post-processing node according to the second post-processing function prototype, wherein the second post-processing node is specified in the topology to receive a stream of data objects output by the post-processing node, performs one or more operations on the data objects according to the second post-processing function prototype, and outputs one or more second modified data objects. The text input specifies a subscription of streams of data objects output by the post-processing node and streams of data objects received by the second post-processing node. The query and the identifier of a post-processing function are received from the user at runtime. The actions include allocating, by the stream computing system, one or more computing nodes for each of the one or more source nodes, the processing node, and the post-processing node, wherein the processing node subscribes to streams from the one or more source nodes, wherein the post-processing node subscribes to a stream from the processing node.

Particular embodiments of the subject matter described in this specification can be implemented so as to realize one or more of the following advantages. A user can quickly and easily generate new stream computing topologies at runtime, which can allow the user to easily develop new searching techniques.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1B:
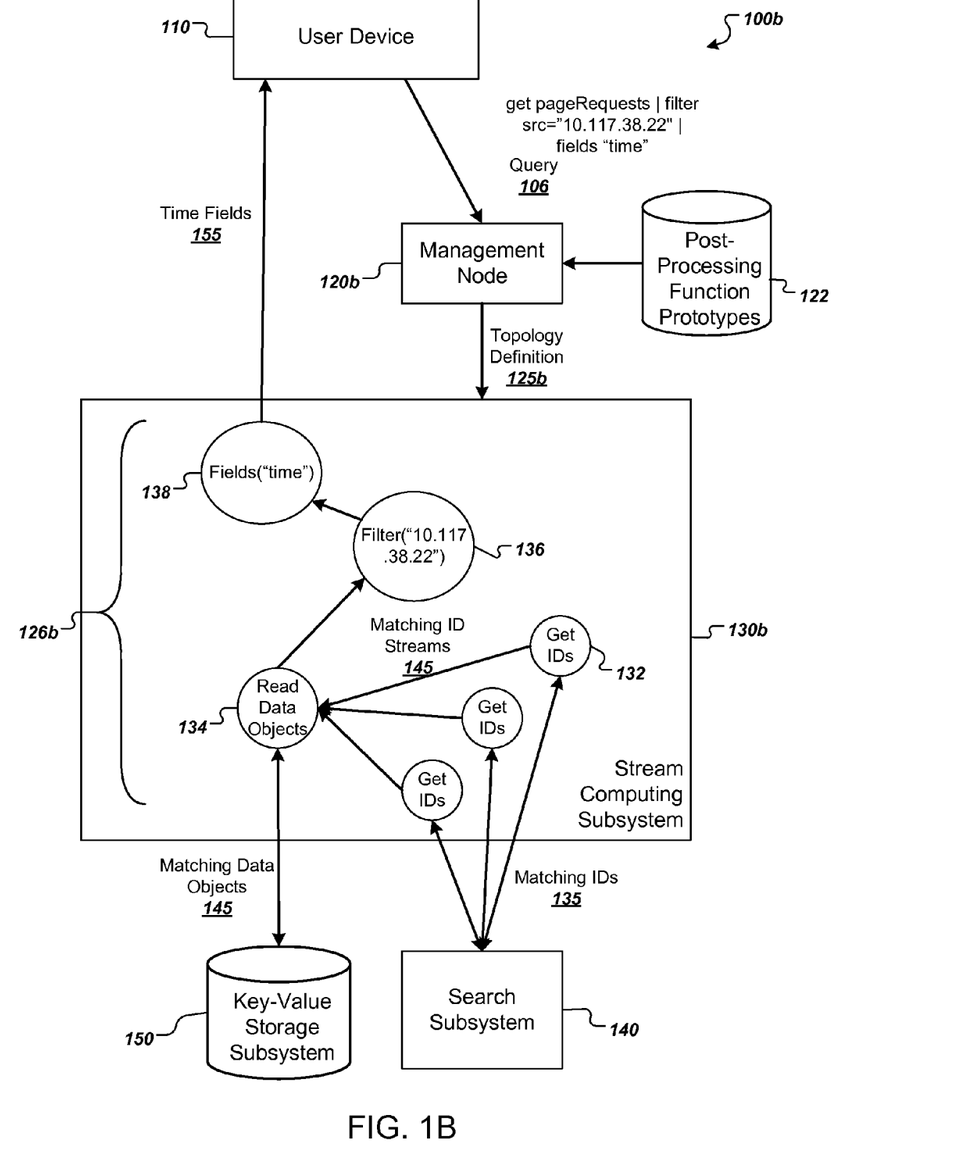
FIG. 1B is a diagram of an example system in accordance with the present invention.

FIG. 1B is a diagram of an example system 100b. The system 100b is an example of a system that generates dynamic stream computing topologies at runtime according to user input. A user can specify, at runtime, a query 106 that causes the management node 120b to generate a topology definition 125b that adds post-processing nodes into the stream computing topology 126b.

The query 106 can specify one or more function prototypes that define post-processing nodes to be added to the topology 125b. The system 100b can maintain a repository 122 of available function prototypes that the management node 120b will use to generate a corresponding topology definition 125b that causes the stream computing subsystem 130b to insert nodes in the topology 126b. Post-processing nodes may have similar functionality to processing nodes in the topology that are generated automatically by the management node 120b in order to satisfy a query. In this specification, post-processing nodes refer to nodes in the topology generated from user-specified function prototypes and, optionally, one or more user-defined arguments.

For example, a user may want to receive streaming data describing real-time web page requests originating from a particular Internet Protocol (IP) address. The user can issue a query for web page requests. Absent a specification by the user of additional post-processing operations, e.g., filtering operations, the stream computing subsystem 130b will return, to the client device, a stream of full data objects that satisfy the query.

The user can also specify function prototypes in the query 106 that will result in additional post-processing nodes to be inserted into the stream computing topology 126b. For example, the user can issue the following query:

get pageRequests|filter src="10.117.38.22" |fields "time"

The "get pageRequests" part of the query is referred to as the base query. The base query specifies one or more search criteria and can be specified in any appropriate format, e.g., as a structured query language query or an object query language query, or as a search query that specifies one or more search terms. The base query is parsed by the management node 120b to generate an initial topology definition.

The "filter" and "fields" terms of the query 106 are reserved terms that refer to function prototypes maintained by the system 100b. The management node 120b will add, to the initial topology definition, one or more post-processing nodes that correspond to the function prototypes specified in the query 106.

The vertical bar character specifies that a post-processing node defined by a function prototype following the vertical bar will subscribe to a stream generated by a node defined by a portion of the query before the vertical bar, which may be another post-processing node or a processing node in the initial topology corresponding to the base query. In other words, the order of function prototypes specified in the query represents a structure of post-processing nodes in the topology 126b and represents the streams between the post-processing nodes. The function prototypes specified in the query can be accompanied by arguments.

For example, the "filter" prototype is accompanied by an argument "src='10.117.38.22'" that specifies how the resulting post-processing node should filter data objects in a received data object stream. The "fields" prototype is accompanied by an argument "time" that specifies the fields that a post-processing node should extract from data objects in a received data object stream.

The management node 120b generates a topology definition 125b corresponding to the query 106 and provides the topology definition 125b to the stream computing subsystem 130b.

The stream computing subsystem 130b receives the topology definition 125b and initializes stream computing nodes according to the topology definition. The functionality of a single logical node in the topology can be implemented as one or more physical computers or as software installed as a virtual machine on a physical computer.

The resulting topology 126b includes three source nodes that receive matching identifiers 135 from the search subsystem 140. The topology also includes a processing node 134 that receives streams of matching identifiers 145 and requests the corresponding matching data objects 145 from the key-value storage subsystem 150.

The topology 126b also includes two post-processing nodes corresponding to the function prototypes specified in the query 106. The topology 126 includes a first post-processing node 136 corresponding to the "filter" function prototype and a second post-processing node 138 corresponding to the "fields" function prototype. As specified by the user query 106, the "filter" post-processing node 136 subscribes to the stream generated by the initial topology corresponding to the base query, e.g., the stream emitted by the processing node 134. Similarly, the "fields" post-processing node 138 subscribes to the stream generated by the "filter" post-processing node 138.

The "filter" post-processing node 136 receives a stream of full matching data objects 145 from the processing node 134. For example, the data objects can be JavaScript Object Notation (JSON) records about web page requests. An example JSON record can include the following information about a web page request:

```
{
    "id": 12323478945,
    "time": 1383851178,
    "src": 10.345.54.233,
    "browsertype" : Mozilla,
    "browserversion" : 7.2,
    "language" : EN,
    "region" : North America,
}
```

The "filter" post-processing node 136 uses the provided argument "src='10.117.38.22'" to generate a stream of data objects that have a field "src" matching the provided value, "10.117.28.22." The stream is provided to the "fields" post-processing node 138.

The "fields" post-processing node 138 extracts one or more fields corresponding to the provided argument "time" to generate a stream 145 of time field data objects that includes only values from the field "time" in the original matching data objects 145, and only for page requests received from IP address "10.117.28.22."

Figure 2:
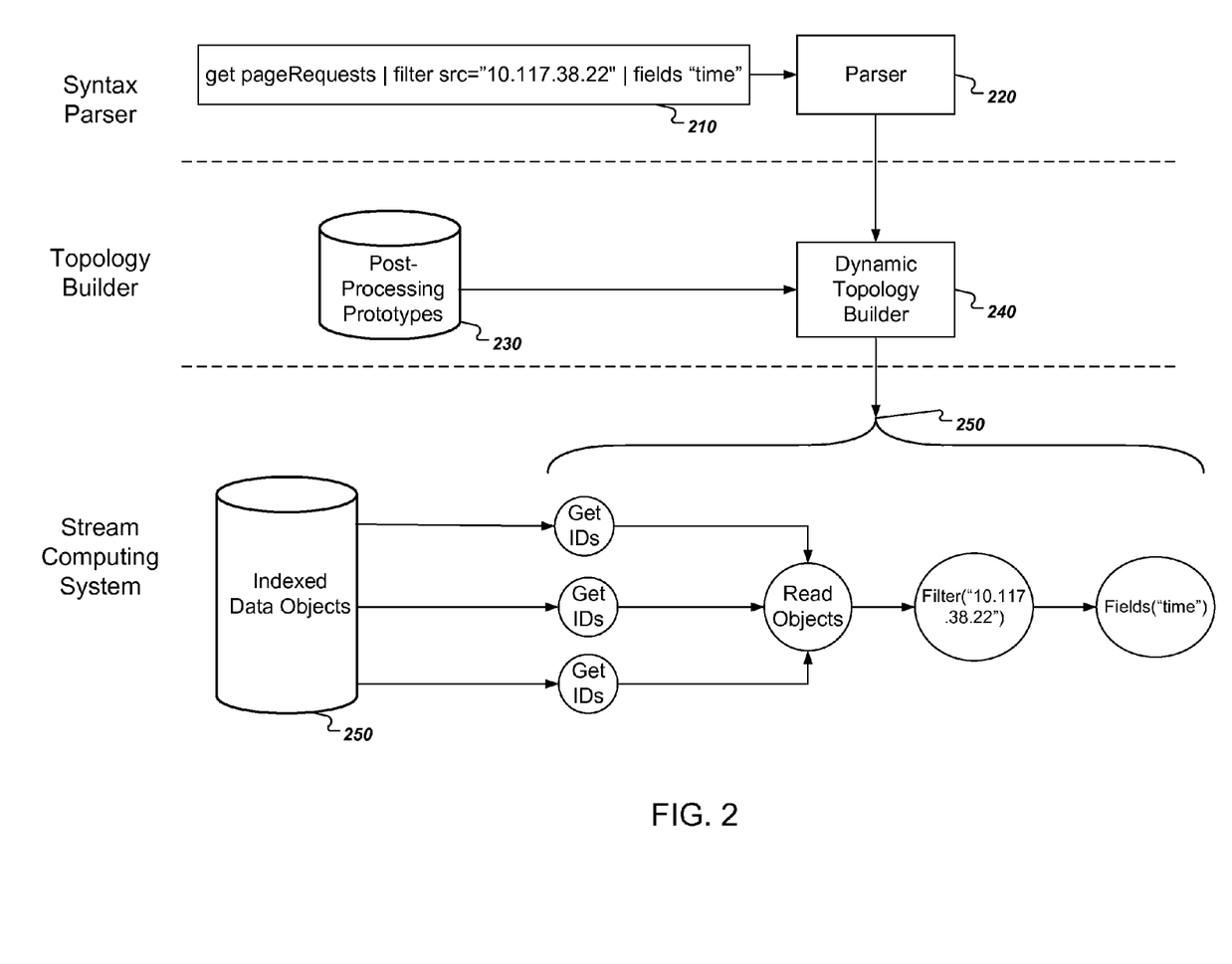
FIG. 2 is a conceptual diagram of dynamic topology generation.

FIG. 2 is a conceptual diagram of dynamic topology generation. In general, a dynamic topology builder 240 can generate dynamic topologies by receiving output of any appropriate query parser 220 that generates stream computing methods from a query. The dynamic topology builder 240 can then provide the dynamic topology to any appropriate stream computing subsystem for execution.

A parser 220 receives a query 210 and parses the query into one or more processes, which are then provided to a dynamic topology builder 240. The dynamic topology builder 240 uses post-processing function prototypes 230 to generate, at runtime, a topology definition according to post-processing functions specified in the query 210. The topology definition is then provided to a stream computing subsystem, which allocates resources to initialize and run computing nodes according to the generated topology. The generated topology 250 can then process streaming data objects, for example, indexed data objects 250 in order to satisfy the query 210.

Figure 3:
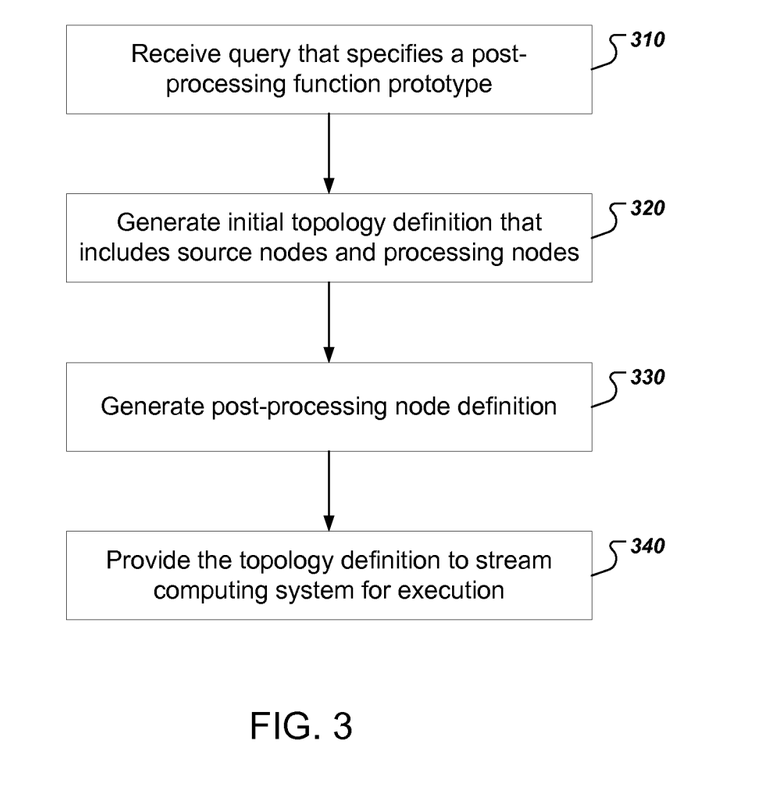
FIG. 3 is a flow chart of an example process for dynamically generating a stream computing topology.

FIG. 3 is a flow chart of an example process for dynamically generating a stream computing topology. In general, a user issues a query that specifies one or more function prototypes that define additional post-processing nodes that should be added to a stream computing topology. The process can be performed by a management node, e.g., the management node 120b in FIG. 1. The process will be described as being performed by a system of one or more appropriately programmed computers.

The system receives, from a user, a query that includes an identifier of a post-processing function prototype (310). The query will generally include a base query that specifies a data collection to search and one or more search criteria. For example, the base query can specify a table name of a relational database or a column-family of an HBase system. The base query can also specify a particular input stream that corresponds to events occurring in real time, e.g., web page requests.

The post-processing function prototype can be one defined in a repository of predefined function prototypes. The identifiers of the function prototypes specified in the query can be reserved terms in the query. The user can also specify one or more arguments for each post-processing function prototype in the query.

An example function prototype is a field extraction prototype. A field extraction prototype defines a function that extracts fields data objects and generates new fields as output. The criteria for field extraction can be specified by any appropriate regular expression format. A function that extracts and passes on values of a "lastName" field is an example of a field extraction prototype.

Another example function prototype is a filter prototype. A filter prototype defines a function that filters data objects according to one or more criteria. The filter criteria can be specified by field name, field value pairs, e.g., "lastName=Smith." The filter criteria can also include other comparison operators, e.g., =, <, >, <=, <=, or !=. A function that passes on only tuples for which "lastName=Smith" and filters out all other tuples is an example of a filter prototype.

Another example function prototype is an aggregate prototype. An aggregate prototype generates an aggregate measure from received data objects that are processed through the topology. A user can indicate a particular predefined aggregate function, e.g., sum, avg, max, min, count, or unique_count, to name just a few examples. A function that counts all tuples for which "lastName=Smith" is an example of an aggregate prototype.

TABLE 1 provides further examples of function prototypes that can be used to generate post-processing nodes in the topology.

TABLE 1

| FUNCTION IDENTIFIER | DESCRIPTION |
| --- | --- |
| rex | Generate new fields from old fields using a regular expression argument |
| filter | Filter data objects according to an argument |
| stats | Compute statistics on data objects according an argument, e.g., sum, avg, max, min, count, unique_count |
| fields | Extract fields from data objects |
| strcat | Concatenates a string argument to a data object field |
| replace | Replaces a value of a data object field with a new value specified by an argument. |
| rename | Renames a data object field with an argument |
| fillnull | Replace null values in data objects with value specified by an argument. |
| addtotals | Compute the sum of all numeric fields for each data object. |
| rangemap | Classify a range of data object values for numerical fields with a descriptive names specified by an argument |
| top | Determine a most common value, among received data objects, of a particular field specified by an argument |
| rare | Determine a least common value, among received data objects, of a particular field specified by an argument |

The system generates an initial topology definition that specifies source nodes and processing nodes (320). In general, the system will parse the base query to generate an initial topology definition. The initial topology definition will include a specification for source nodes that determine data object identifiers of data objects that satisfy the one or more search criteria in the data collection specified by the base query. The source nodes will generate streams of matching identifiers that are provided to one or more processing nodes. The processing nodes will generally include at least one node that reads from a key-value storage subsystem for data objects of the matching identifier streams.

The system generates a post-processing node definition (330). The system can add additional post-processing nodes to the topology definition according to the function prototypes and arguments specified by the user in the query. The function prototypes define operations to be performed by the post-processing node, e.g., by specifying source or object code to be performed by the node. The function prototypes can be implemented in any appropriate programming language, e.g., Java, Ruby, Python, or Fancy, to name just a few examples.

The system provides the topology definition to a stream computing system for execution (340). The stream computing system will generate a real-time stream computing topology according to the topology definition. For example, the stream computing system can allocate one or more computing nodes for each node in the topology and establish network connections between computing nodes that correspond to stream subscriptions in the topology.

The stream computing system can activate the topology, which causes the sources nodes to begin generating streams for processing by other nodes in the topology. The topology will generally remain active by continually generating identifier streams of matching data objects as they are found or as they are added to the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, from a user, a query that specifies a search criterion and a post-processing function prototype;
   generating, from the query, a topology definition that specifies:
      one or more source nodes and at least one processing node, wherein the processing node is specified in the topology to receive, from the one or more source nodes, one or more streams of data object identifiers of data objects that satisfy the search criterion, and wherein the processing node is specified in the topology to output a stream of data objects corresponding to the data object identifiers; and
      a post-processing node according to the post-processing function prototype, wherein the post-processing node is specified in the topology to receive a stream of data objects output by the processing node, perform one or more operations on the data objects according to the post-processing function prototype, and is specified in the topology to output one or more modified data objects; and
   providing the topology definition to a real-time stream computing system for execution.

2. The method of claim 1, wherein the query is a search query that specifies one or more search terms, and wherein the data object identifiers of data objects that satisfy the search query are data objects having field values that satisfy the search terms.

3. The method of claim 1, further comprising:
   receiving, from the user, an argument for the post-processing function prototype, wherein the post-processing node is specified in the topology to perform the one or more operations on the data objects using the argument.

4. The method of claim 3, wherein the post-processing function prototype is a field extraction prototype, and wherein the post-processing node generated from the post-processing function prototype is specified in the topology to extract fields from the received data objects according to the argument and provides the extracted fields as output.

5. The method of claim 3, wherein the post-processing function prototype is a filtering prototype, and wherein the post-processing node generated from the post-processing function prototype is specified in the topology to filter the data objects received by the post-processing node according to the argument and provides the filtered data objects as output.

6. The method of claim 3, wherein the post-processing function prototype is an aggregating prototype, and wherein the post-processing node generated from the function prototype is specified in the topology to aggregate one or more data object values specified by the argument and provides an aggregated value as output.

7. The method of claim 1, wherein the query and the identifier of the post-processing function are text provided as input by the user.

8. The method of claim 1, further comprising:
receiving a second identifier of a different, second post-processing function prototype,
wherein the topology definition specifies a second post-processing node according to the second post-processing function prototype, wherein the second post-processing node is specified in the topology to receive a stream of data objects output by the post-processing node, performs one or more operations on the data objects according to the second post-processing function prototype, and outputs one or more second modified data objects.

9. The method of claim 8, wherein the query and the identifier of the post-processing function are text input received from the user, wherein the text input specifies a subscription of streams of data objects output by the post-processing node and streams of data objects received by the second post-processing node.

10. The method of claim 1, wherein the query and the identifier of a post-processing function are received from the user at runtime.

11. The method of claim 1, further comprising:
allocating, by the stream computing system, one or more computing nodes for each of the one or more source nodes, the processing node, and the post-processing node,
wherein the processing node subscribes to streams from the one or more source nodes, wherein the post-processing node subscribes to a stream from the processing node.

12. A system comprising:
one or more computers and one or more storage devices storing instructions that are operable, when executed by the one or more computers, to cause the one or more computers to perform operations comprising:
receiving, from a user, a query that specifies a search criterion and a post-processing function prototype;
generating, from the query, a topology definition that specifies:
one or more source nodes and at least one processing node, wherein the processing node is specified in the topology to receive, from the one or more source nodes, one or more streams of data object identifiers of data objects that satisfy the search criterion, and wherein the processing node is specified in the topology to output a stream of data objects corresponding to the data object identifiers; and
a post-processing node according to the post-processing function prototype, wherein the post-processing node is specified in the topology to receive a stream of data objects output by the processing node, perform one or more operations on the data objects according to the post-processing function prototype, and is specified in the topology to output one or more modified data objects; and
providing the topology definition to a real-time stream computing system for execution.

13. The system of claim 12, wherein the query is a search query that specifies one or more search terms, and wherein the data object identifiers of data objects that satisfy the search query are data objects having field values that satisfy the search terms.

14. The system of claim 12, wherein the operations further comprise:
receiving, from the user, an argument for the post-processing function prototype, wherein the post-processing node is specified in the topology to perform the one or more operations on the data objects using the argument.

15. The system of claim 14, wherein the post-processing function prototype is a field extraction prototype, and wherein the post-processing node generated from the post-processing function prototype is specified in the topology to extract fields from the received data objects according to the argument and provides the extracted fields as output.

16. The system of claim 14, wherein the post-processing function prototype is a filtering prototype, and wherein the post-processing node generated from the post-processing function prototype is specified in the topology to filter the data objects received by the post-processing node according to the argument and provides the filtered data objects as output.

17. The system of claim 14, wherein the post-processing function prototype is an aggregating prototype, and wherein the post-processing node generated from the function prototype is specified in the topology to aggregate one or more data object values specified by the argument and provides an aggregated value as output.

18. The system of claim 12, wherein the query and the identifier of the post-processing function are text provided as input by the user.

19. The system of claim 12, wherein the operations further comprise:
receiving a second identifier of a different, second post-processing function prototype,
wherein the topology definition specifies a second post-processing node according to the second post-processing function prototype, wherein the second post-processing node is specified in the topology to receive a stream of data objects output by the post-processing node, performs one or more operations on the data objects according to the second post-processing function prototype, and outputs one or more second modified data objects.

20. The system of claim 19, wherein the query and the identifier of the post-processing function are text input received from the user, wherein the text input specifies a subscription of streams of data objects output by the post-processing node and streams of data objects received by the second post-processing node.

21. The system of claim 12, wherein the query and the identifier of a post-processing function are received from the user at runtime.

22. The system of claim 12, wherein the operations further comprise:
allocating, by the stream computing system, one or more computing nodes for each of the one or more source nodes, the processing node, and the post-processing node, wherein the processing node subscribes to streams from the one or more source nodes, wherein the post-processing node subscribes to a stream from the processing node.

23. A computer program product, encoded on one or more non-transitory computer storage media, comprising instructions that when executed by one or more computers cause the one or more computers to perform operations comprising:

receiving, from a user, a query that specifies a search criterion and a post-processing function prototype;

generating, from the query, a topology definition that specifies:

one or more source nodes and at least one processing node, wherein the processing node is specified in the topology to receive, from the one or more source nodes, one or more streams of data object identifiers of data objects that satisfy the search criterion, and wherein the processing node is specified in the topology to output a stream of data objects corresponding to the data object identifiers; and a post-processing node according to the post-processing function prototype, wherein the post-processing node is specified in the topology to receive a stream of data objects output by the processing node, perform one or more operations on the data objects according to the post-processing function prototype, and is specified in the topology to output one or more modified data objects; and providing the topology definition to a real-time stream computing system for execution.

* * * * *